United States Patent
Hill et al.

(10) Patent No.: US 10,375,244 B2
(45) Date of Patent: Aug. 6, 2019

(54) PREMISES ENABLED MOBILE KIOSK, USING CUSTOMERS' MOBILE COMMUNICATION DEVICE

(75) Inventors: Deborah Hill, Broomfield, CO (US); Sarah H. Kiefhaber, Longmont, CO (US); Joylee E. Kohler, Nothglenn, CO (US); Katherine A. Sobus, Wilmington, DE (US); Rodney A. Thomson, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 667 days.

(21) Appl. No.: 12/186,905

(22) Filed: Aug. 6, 2008

(65) Prior Publication Data
US 2010/0036670 A1 Feb. 11, 2010

(51) Int. Cl.
| | | |
|---|---|---|
| *H04M 3/523* | (2006.01) | |
| *G06Q 30/00* | (2012.01) | |
| *G06Q 30/02* | (2012.01) | |
| *H04W 4/02* | (2018.01) | |
| *H04L 29/08* | (2006.01) | |

(52) U.S. Cl.
CPC .......... *H04M 3/523* (2013.01); *G06Q 30/016* (2013.01); *G06Q 30/02* (2013.01); *H04W 4/02* (2013.01); *H04L 67/18* (2013.01); *H04L 67/24* (2013.01); *H04M 2242/30* (2013.01)

(58) Field of Classification Search
CPC .... G06Q 30/06; G06Q 30/0601; G06Q 30/02; G06Q 30/0205; G06Q 30/0281; G06Q 30/0641; G06Q 50/10; G06Q 30/0241; G06Q 30/061; G06Q 30/016; G06Q 30/01; G06Q 10/06; G06Q 10/20; G06Q 50/01; G06Q 90/00; G06Q 90/20; H04M 3/42348; H04M 3/51; H04M 3/523; H04M 2242/30; H04W 4/02; H04L 67/18; H04L 67/24
See application file for complete search history.

(56) References Cited

U.S. PATENT DOCUMENTS

| | | |
|---|---|---|
| 4,163,124 A | 7/1979 | Jolissaint |
| 4,567,323 A | 1/1986 | Lottes et al. |
| 4,737,983 A | 4/1988 | Frauenthal et al. |
| 4,797,911 A | 1/1989 | Szlam et al. |

(Continued)

FOREIGN PATENT DOCUMENTS

| | | |
|---|---|---|
| JP | 2001-283327 | 10/2001 |
| JP | 2007-537496 | 12/2007 |

OTHER PUBLICATIONS

Ric Kosiba, "The Importance of Customer Segmentation", Society of Workforce Planning Professionals, Spring 2006, http://www.swpp.org/member/newsletter-archive/spring2006/advancedtopics.html (Year: 2006).*

(Continued)

*Primary Examiner* — Gerardo Aaque, Jr.
(74) *Attorney, Agent, or Firm* — Sheridan Ross P.C.

(57) ABSTRACT

A contact center is provided that can service customers on premises via a mobile kiosk. The mobile kiosk may be carried by the customer or by an on-site customer service representative. The mobile kiosk may be enqueued in the contact center contact queue such that enhanced customer service can be provided through interfacing with the enterprise database, vendor databases, as well as assigning an appropriately skilled contact center agent to the customer contact.

30 Claims, 8 Drawing Sheets

(56) References Cited

U.S. PATENT DOCUMENTS

| | | |
|---|---|---|
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Constantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,874 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Brenernan et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,138,139 A * | 10/2000 | Beck et al. .................. 709/202 |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,240,471 B1 | 5/2001 | Eastwick |
| 6,259,969 B1 | 7/2001 | Tackett et al. |
| 6,263,359 B1 | 7/2001 | Fong et al. |
| 6,272,347 B1 | 8/2001 | Griffith et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,353,810 B1 | 3/2002 | Pertrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Pertrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,560,330 B2 | 5/2003 | Gabriel |

(56) References Cited

U.S. PATENT DOCUMENTS

| | | | |
|---|---|---|---|
| 6,560,649 B1 | 5/2003 | Mullen et al. | |
| 6,560,707 B2 | 5/2003 | Curtis et al. | |
| 6,563,920 B1 | 5/2003 | Flockhart et al. | |
| 6,587,835 B1* | 7/2003 | Treyz et al. | 705/14.64 |
| 6,597,685 B2 | 7/2003 | Miloslavsky et al. | |
| 6,614,903 B1 | 9/2003 | Flockhart et al. | |
| 6,650,748 B1 | 11/2003 | Edwards et al. | |
| 6,697,457 B2 | 2/2004 | Petrushin | |
| 6,704,409 B1 | 3/2004 | Dilip et al. | |
| 6,707,903 B2 | 3/2004 | Burok et al. | |
| 6,754,333 B1 | 6/2004 | Flockhart et al. | |
| 6,766,013 B2 | 7/2004 | Flockhart et al. | |
| 6,766,014 B2 | 7/2004 | Flockhart et al. | |
| 6,813,608 B1 | 11/2004 | Baranowski | |
| 6,845,361 B1* | 1/2005 | Dowling | 705/5 |
| 6,947,543 B2 | 9/2005 | Alvarado et al. | |
| 7,035,927 B2 | 4/2006 | Flockhart et al. | |
| 7,283,846 B2* | 10/2007 | Spriestersbach et al. | 455/566 |
| 7,558,739 B2* | 7/2009 | Thomson | 705/7.29 |
| 8,636,209 B2* | 1/2014 | Dennard et al. | 235/383 |
| 9,019,066 B2* | 4/2015 | Black et al. | 340/3.1 |
| 2002/0016750 A1 | 2/2002 | Attia | |
| 2002/0194002 A1 | 12/2002 | Pertrushin | |
| 2003/0058884 A1* | 3/2003 | Kallner et al. | 370/465 |
| 2003/0174830 A1 | 9/2003 | Boyer et al. | |
| 2003/0177017 A1 | 9/2003 | Boyer et al. | |
| 2004/0078209 A1* | 4/2004 | Thomson | 705/1 |
| 2004/0172316 A1* | 9/2004 | Hale et al. | 705/5 |
| 2004/0203633 A1 | 10/2004 | Knauerhase et al. | |
| 2004/0203878 A1* | 10/2004 | Thomson | 455/456.1 |
| 2004/0204063 A1 | 10/2004 | Van Erlach | |
| 2006/0289637 A1 | 12/2006 | Brice et al. | |
| 2006/0293968 A1 | 12/2006 | Brice et al. | |
| 2007/0008068 A1 | 1/2007 | Brice et al. | |
| 2007/0069923 A1* | 3/2007 | Mendelson | 340/988 |
| 2007/0071222 A1* | 3/2007 | Flockhart et al. | 379/265.02 |
| 2007/0152041 A1* | 7/2007 | Hawkins | 235/383 |
| 2008/0016181 A1* | 1/2008 | Burckart et al. | 709/219 |
| 2008/0219429 A1* | 9/2008 | Mandalia et al. | 379/266.02 |
| 2010/0036670 A1* | 2/2010 | Hill et al. | 705/1 |
| 2011/0216897 A1* | 9/2011 | Laredo et al. | 379/265.13 |
| 2014/0019603 A1* | 1/2014 | Dunko | 709/223 |

OTHER PUBLICATIONS

Internet Article "Singaporei's first intelligent Innovative shopping carts—MediaCarts—to make its debut at a new Cold Storage supermarket outlet in Singapore," http:/ www.mediacartasia.com/mca_cs_press.html; Feb. 7, 2008; 2 pgs.

Official Action (with English translation) for Japanese Patent Application No. 2009-181153, dated Nov. 20, 2012, 5 pages.

Official Action for European Patent Application No. 08017882.5, dated Jun. 15, 2015 4 pages.

Official Action for European Patent Application No. 08017882.5, dated Mar. 28, 2017 4 pages.

Official Action for European Patent Application No. 08017882.5, dated Mar. 13, 2018 3 pages.

Intention to Grant for European Patent Application No. 08017882.5, dated Aug. 17, 2018 55 pages.

* cited by examiner

PREMISES ENABLED MOBILE KIOSK, USING CUSTOMERS' MOBILE COMMUNICATION DEVICE

FIELD

The present invention is directed generally to customer service and more specifically to the implementation of contact center architecture at a physical location.

BACKGROUND

Contact centers are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in a present-day automatic call distributor (ACD), when the ACD system's controller detects that an agent has become available to handle a contact, the controller identifies all predefined contact-handling queues for the agent (usually in some order of priority) and delivers to the agent the highest-priority oldest contact that matches the agent's highest-priority queue. Generally, the only condition that results in a contact not being delivered to an available agent is that there are no contacts waiting to be handled. This type of contact distribution is generally known as skill-based routing.

Today's contact centers have many ways to tailor a customer's experience based on the customer's history or real-time interactions with a web site or IVR. Contact center agents (or service representatives, used interchangeably in this document) can leverage this information to cross-sell or up-sell a customer at the time of contact. Today's contact centers are also equipped to survey a customer at the end of a contact.

While these capabilities are readily available over the phone or Internet, they are not readily available on premises at a retail site, for example. Businesses that have face-to-face contact with customers, such as a retail store, restaurant, etc. are not able to identify a customer, know the customer history, or determine current needs of the customer as the contact center can.

As an example, a customer could walk in to a local hardware store looking for a particular item. The sales associates may not have a clue that the customer is a frequent purchaser at their store. Also, the associates may not know that that the customer bought a lawn mower last year nor would they know the make and model of the lawn mower, its part numbers, related parts and objects, or whether there are any potential recall issues with the lawn mower. This means that although the customer is receiving face-to-face assistance, he/she is not necessarily being serviced in the most efficient manner.

SUMMARY

Thus, there appears to be the possibility of interacting with customers in a face-to-face manner while also providing the advantages offered by a contact center system. More specifically, the possibility of interacting with not only the enterprise knowledge base, but also the vendor knowledge base that provides inventory to the enterprise has not yet been filly exploited.

These and other needs are addressed by the various embodiments and configurations of the present invention. The present invention is directed generally to premises-enabled mobile kiosk. The mobile kiosk may be utilized to provide contact center-type customer service to a customer located on the physical premises. The mobile kiosk may be carried either by the customer (e.g., the customer's cellular phone or mobile email retrieval device) or by a customer service agent on premises. In accordance with at least some embodiments of the present invention, a method is provided that generally comprises:

determining that a customer has entered a predefined area corresponding to a premises;

in response to the detecting step, generating a contact for the customer via a mobile kiosk;

tagging the contact with a premises tag which indicates that the contact is originating with an association to the premises; and sending the contact to a contact center.

The tagging step may occur before or after the sending step. In one embodiment, the mobile kiosk may be responsible for tagging the contact prior to sending the contact. In such an embodiment, the premises tag and its associated information may be included in a header of the message or in the payload of the message. The premises tag may identify that the mobile kiosk is initiating the contact from a certain premises and may further identify the premises. The premises information may be provided to the mobile kiosk via Near Field Communications (NFC) technology or Bluetooth (i.e., the premises may provide the premises identifier to the mobile kiosk before the mobile kiosk generates the contact). The premises tag may be included in addition to traditional caller identification information. Even if caller identification is blocked for the mobile kiosk it may be possible to transmit the contact with a premises tag identifying the premises from which the contact is originating.

In another embodiment, the contact may be tagged with the premises tag after the mobile kiosk has transmitted the contact. The tagging may occur at a dedicated gateway or service point (e.g., cellular tower) that services the premises. Any contacts that pass through such a service point may be tagged with a premises tag prior to or subsequent to being forwarded to the contact center. Another way that tagging may be accomplished is to have the customer dial a dedicated number that is used for receiving contacts from a particular premises. In this particular embodiment, when the contact center receives the contact and identifies that the contact was initiated by calling the dedicated number, the contact center may tag the contact with a premises tag, thereby allowing it to be identified as a premises-based contact and further allowing the contact center to identify the premises from which the contact originated.

In accordance with at least some embodiments of the present invention, the premises tag may be utilized to determine queue assignments and positioning in the contact center. Furthermore, the premises tag may be utilized to identify which databases (e.g., vendor and/or enterprise databases) should be accessed for the received contact. This allows the contact center to more efficiently and effectively service the contact.

In accordance with one embodiment of the present invention, a method is provided comprising:

receiving a contact in a contact center, wherein the contact includes caller identification information; and analyzing the contact to determine whether the contact further includes a premises tag.

As noted above, the caller identification information is traditionally transmitted with a contact to a contact center. This information, whether it is actually available or only available to the extent that the sender has allowed (i.e., the sender has required that caller identification information either be partially or fully blocked) is received by the contact center and can be used to route the contact. The additional presence of a premises tag in a contact can further help the contact center make routing decisions. More specifically, if a contact center is used to service contacts from a number of different businesses, the premises tag can help the contact center identify which business the contact is related to. Moreover, the premises tag can be used to identify the contact center agents or resources that can be assigned to the contact.

As can be appreciated by one of skill in the art, a contact is understood herein to include but is not limited to voice calls, emails, chat, video calls, fax, voicemail messages and combinations thereof. Accordingly, a contact center may be equipped to handle any one or a number of the above-noted contact types.

These and other advantages will be apparent from the disclosure of the method(s) and apparatus(es) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

Embodiments of the invention will be illustrated below in conjunction with an exemplary communication system. Although well suited for use with, e.g., a system having an ACD or other similar contact-processing switch, the invention is not limited to any particular type of communication system switch or configuration of system elements. Those skilled in the art will recognize that the disclosed techniques may be used in any communication application in which it is desirable to provide improved customer service.

The exemplary systems and methods of this invention will also be described in relation to analysis software, modules, and associated analysis hardware. However, to avoid unnecessarily obscuring the present invention, the following description omits well-known structures, components and devices that may be shows in block diagram form, are well known, or are otherwise summarized.

For purposes of explanation, numerous details are set forth in order to provide a thorough understanding of the present invention. It should be appreciated, however, that embodiments of the present invention may be practiced in a variety of ways beyond the specific details set forth herein.

Figure 1:
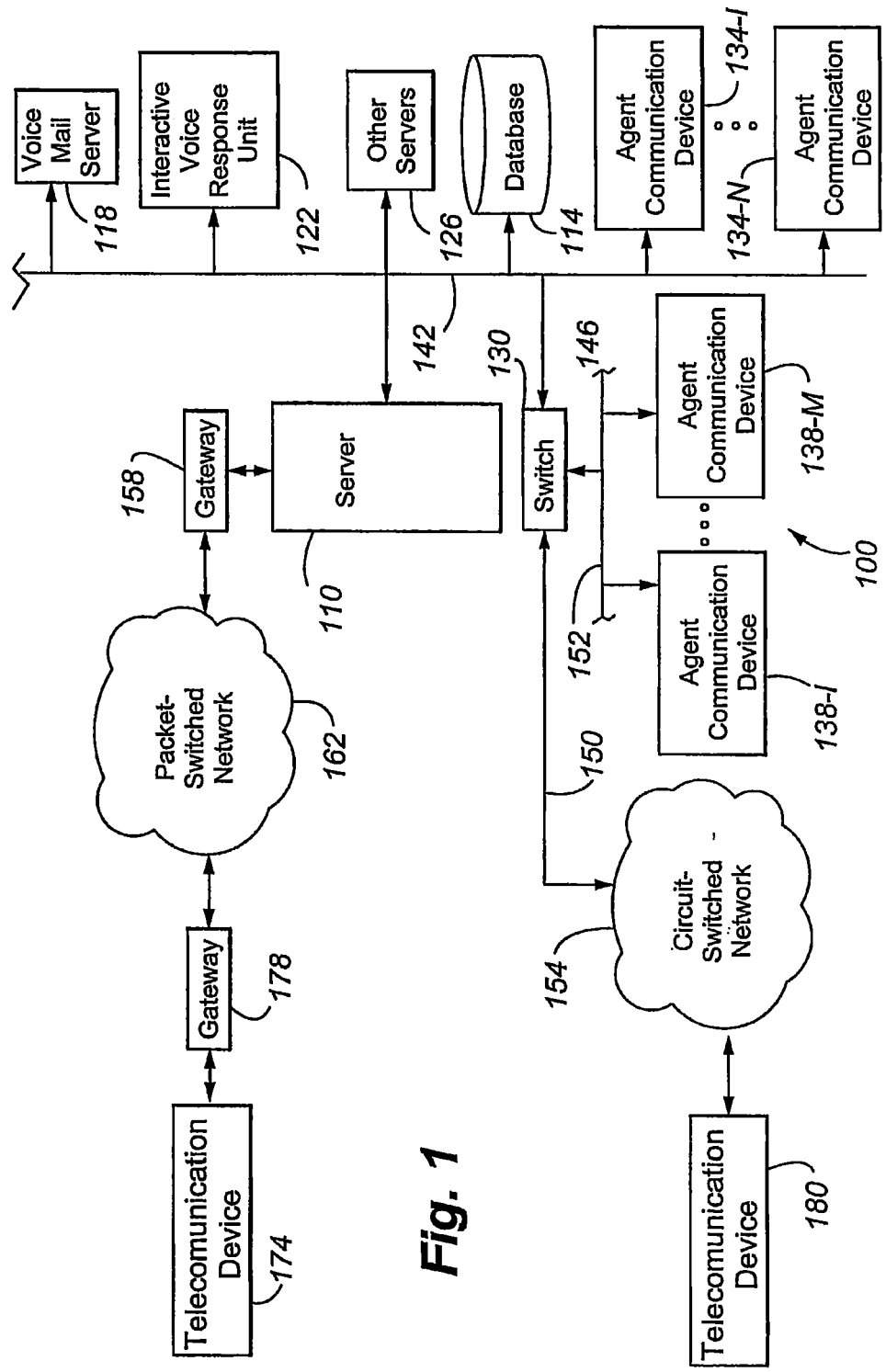
FIG. 1 is a block diagram depicting a contact center according to at least some embodiments of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Voice Response unit or IVR 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN, which may include remote agents connected to the LAN via a long-distance connection between LANs) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, an email server, and the like. The switch 130 is connected via a plurality of trunks 150 to the Public Switch Telephone Network or PSTN 154 and via link(s) 152 to the second communication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 2:
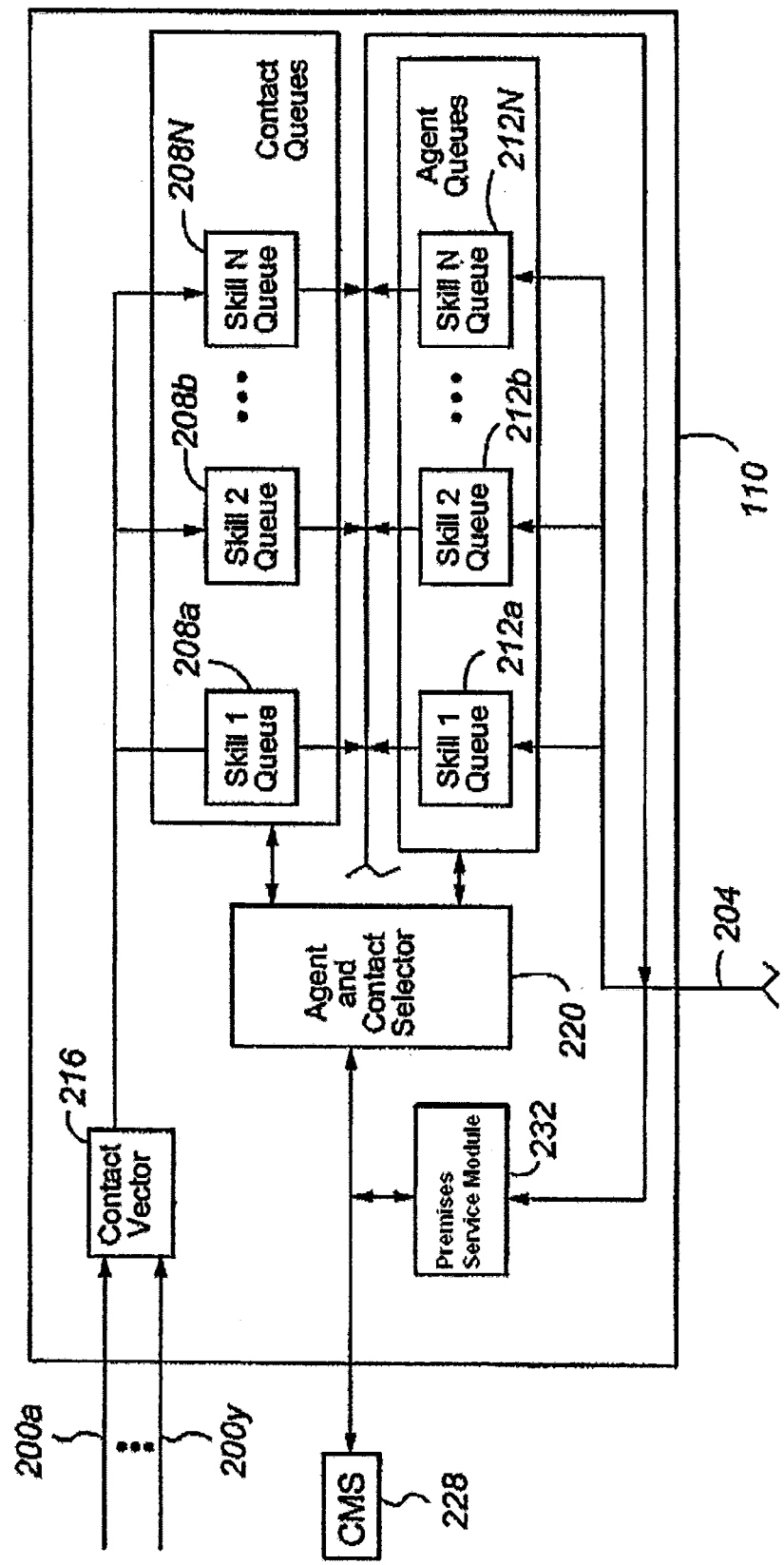
FIG. 2 is a block diagram of a server or similar contact routing device according to at least some embodiments of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include a Call Management System™ or CMS 228 that gathers call records and contact-center statistics for use in generating contact-center reports. CMS 228 and any other reporting system, such as a Basic Call Management System™, Operational Analyst™, Customer Call Routing or CCR™, Avaya IQ, or Interaction Center™ or any other reporting platform will hereinafter be referred to jointly as CMS 228.

The switch 130 and/or server 110 can be any architecture for directing contacts to one or more communication devices. In some embodiments, the switch 130 may perform load-balancing functions by allocating incoming or outgoing contacts among a plurality of logically and/or geographically distinct contact centers. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, SIP Enabled Services™, and/or Avaya Interaction Center™ or any other switching platform. Typically, the switch/server is a stored-program-controlled system that conventionally includes interfaces to external communication links, a communications switching fabric, service circuits (e.g., tone generators, announcement circuits, etc.), memory for storing control programs and data, a processor (i.e., a computer) for executing the stored control programs to control the interfaces and the fabric, and to provide automatic contact-distribution functionality. The switch and/or server typically include a network interface card (not shown) to provide services to the serviced communication devices. Other types of known switches and servers are well known in the art and therefore not described in detail herein.

As can be seen in FIG. 2, included among the data stored in the server 110 is a set of contact queues 208a-n and a separate set of agent queues 212a-n. Each contact queue 208a-n corresponds to a different set of agent queues, as each agent queue 212a-n corresponds to a different set of contact queues 208a-n. Conventionally, contacts are prioritized and either are enqueued in individual ones of the contact queues 208a-n in their order of priority or are enqueued in different ones of a plurality of contact queues that correspond to a different priority. Likewise, each of the agent's queues are prioritized according to an agent's level of expertise in that queue. Agents can be enqueued in individual ones of agent queues 212a-n in their order of expertise level or can be enqueued in different ones of a plurality of agent queues 212a-n that correspond to a queue and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring to FIG. 1, the gateway 158 can be Avaya Inc.'s, G700 Media Gateway™ and may be implemented as hardware such as via an adjunct processor (as shown) or as a chip or collection of chips in the server.

The first communication devices 134-1, . . . 134-N are packet-switched and can include, for example, IP hardphones such as the Avaya Inc.'s, 4600 Series IP Phones™, IP softphones such as Avaya Inc.'s, IP Softphone™, packet-based wireless phones, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1, . . . 1138-M are circuit-switched. Each of the communication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional communication device endpoints serviced by the switch/server, and the switch/server can direct incoming calls to and receive outgoing calls from these extensions in a conventional manner. The second communication devices can include, for example, wired and wireless telephones, PDAs, H.320 video phones and conferencing units, fax machines, analog and DCP digital phones, voice messaging and response units, traditional computer telephony adjuncts, and any other communication device.

It should be noted that embodiments of the invention do not require any particular type of information transport medium between switch or server and first and second communication devices, i.e., the methods and apparatuses disclosed herein may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first communication device 174 via a gateway 178, and the circuit-switched network 154 with an external second communication device 180. These communication devices are referred to as "external" in that they are not directly supported as Communication device endpoints by the switch or server. The communication devices 174 and 180 are an example of devices more generally referred to herein as "external endpoints."

In one configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the server 110 forwards instructions to the component to forward or route the contact to a specific contact center resource, such as the IVR unit 122, the voice mail server 118, and/or first or second communication device 134, 138 associated with a selected agent, which may include an agent remotely connected to the LAN via a WAN-type connection. The server 110 distributes and connects these contacts to communication devices of available agents based on the predetermined criteria noted above. When the central server 110 forwards a voice contact to an agent, the central server 110 also forwards customer-related information from databases 114 to the agent's computer work station for previewing and/or viewing (such as by a pop-up display) to permit the agent to better serve the customer. The agents process the contacts sent to them by the central server 110.

According to at least one embodiment of the present invention, a premises service module 232 is provided. The premises service module 232 may be capable of tagging a received contact as a premises-based contact. In other words, the premises service module 232 may identify contacts that are initiated from a premise and mark such contacts accordingly. The use of a premises tag may allow the marked contact to receive preferential treatment in the contact center. For example, a marked contact may be sent to a contact queue that is dedicated to premises contacts. As another example, a marked contact may be assigned a higher queue position as compared to where it would be assigned if it did not have the tag.

A premises tag may also serve a second purpose. In accordance with at least some embodiments of the present invention, the premises tag may comprise an identifier of the premises or enterprise from which the contact originated. This is particularly useful for contact centers that service more than one enterprise and/or premises. The identifier included in the premises tag may further comprise a pointer to the appropriate database associated with the premises. Thus, when an agent is connected with the contact, the pointer/identifier of the premises tag may be used to retrieve information from the appropriate premises database as well as from a related vendor database and/or enterprise database.

In an alternative embodiment, a contact initiated on premises may be tagged with a premises tag prior to routing the contact to the contact center. In such an embodiment, the premises service module 232 may be operable to read the premises tag and assign the contact to a priority queue. Alternatively, the premises service module 232 may assign the contact a shorter wait time than other non-premises contacts. In this particular embodiment, the sending communication device may tag the contact with the premises tag. The premises tag and its associated information is different from the traditional caller identification information sent with a contact. More specifically, the caller identification information typically has a one-to-one relationship with a communication device, meaning that caller identification information (e.g., caller name and number of the communication device) is unique to the communication device. There may be certain times when an area code portion of the caller identification information may be shared among several communication devices, but such information simply identifies a way of calling the communication device back. Data included in the premises tag, on the other hand, may identify physical location information for the sending communication device and such physical location information may be specific to a particular premises. This location information may be used to help guide the customer around the premises. Additionally, the premises tag may include information that can be used to prioritize the contact based on the premises from which it is originating.

Thus, in accordance with at least some embodiments of the present invention, a contact may be generated and sent to a contact center 100 where the contact includes a premises tag in addition to the traditional caller identification information. The incorporation of the premises tag may be utilized by the contact center 100 to supplement routing decisions and agent assignments.

Figure 3:
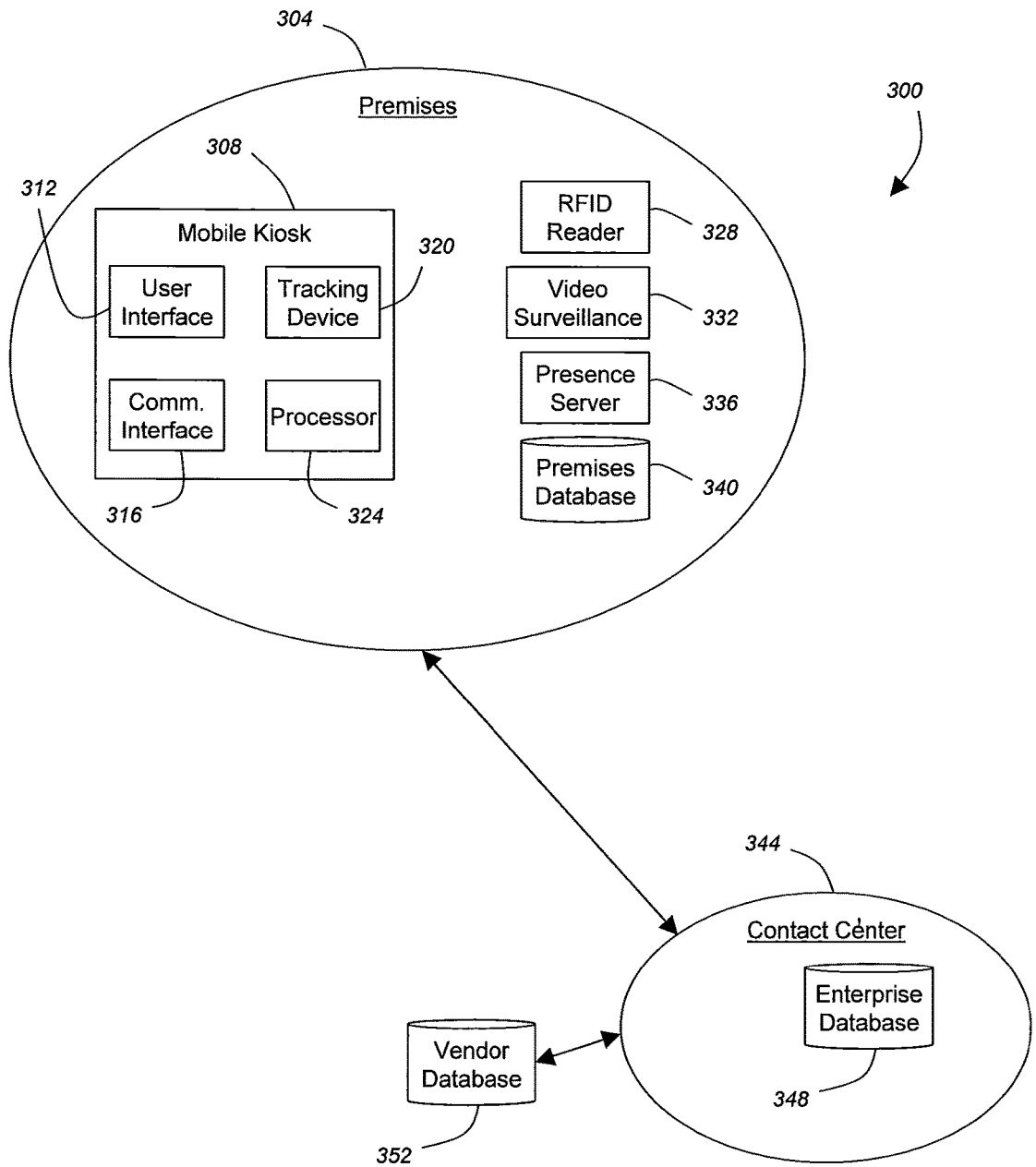
FIG. 3 is a block diagram depicting a mobile kiosk on a physical premises in accordance with at least some embodiments of the present invention.

Referring now to FIG. 3, an exemplary customer service system 300 will be described in accordance with at least some embodiments of the present invention. The customer service system 300 may include premises 304 that represents a physical location where customers may view products and/or services as well as speak with customer service representatives face-to-face. The customer service system 300 may also include a contact center 100, 344 where certain contacts initiated in the premises 304 can be routed. The contact center 100, 344 may comprise a plurality of customer service agents that have a particular skill or skill-set. As an example, the contact center 100, 344 may comprise agents that are able to speak multiple languages and, thus, may be able to help service contacts initiated on premises 304 to help service customers with special language needs. It should be appreciated that the customer service system 300 may include a plurality of premises 304 in communication with the contact center 100, 344 and the contact center 100, 344 may be capable of redirecting contacts received from one premises 304 to either a customer service agent in the contact center 100, 344 or a customer service agent at another premises 304.

By having a single contact center 100, 344 help service contacts from a number of different premises 304, the costs associated with staffing certain key personnel at each premises 304 can be offset by having those key personnel work at the contact center 100, 344. As an example, it may be desirable to have a customer service agent at each premises 304 that is capable of speaking multiple languages (e.g., sign-language, Spanish, French, English, Chinese, Japanese, Russian, or any other specialized language). However, staffing each premises 304 with such a customer service agent may be expensive or otherwise impractical since their specialized skills may only be needed at the premises 304 once a day. But, if the same customer service agent were located at a point that is centrally available to many premises 304, this would allow the specialized skills of the customer service agent to be leveraged by multiple premises 304 and those skills may be more fully utilized, possibly helping offset the costs associated with maintaining such a specialized customer service agent. The specialized customer service agent may be made available directly to customers or may provide assistance to customer service agents that are on premises 304 and speaking with a customer that requires the agent's special skills.

With respect to the details of the premises 304, a mobile kiosk 308 may be included in the premises 304. The mobile kiosk 308 may comprise a user interface 312, a communication interface 316 for connecting the mobile kiosk 308 with the contact center 100, 344, a tracking device 320 (e.g., an RFID tag or a Global Positioning System (GPS)), and a processor 324. The processor 324 may include any general-purpose programmable processor, digital signal processor (DSP) or controller for executing application programming. Alternatively, the processor 324 may comprise a specially configured application-specific integrated circuit (ASIC). The processor 324 generally functions to run programming code implementing various functions performed by the mobile kiosk 308.

Although not depicted, the mobile kiosk 308 may additionally include memory for use in connection with the execution of programming by the processor 324 and for the temporary or long-term storage of data or program instructions. The memory may comprise solid-state memory resident, removable or remote in nature, such as DRAM and SDRAM. Where the processor 324 comprises a controller, the memory may be integral to the processor 324. The memory may be volatile and/or non-volatile memory.

In addition, the user interface 312 of the mobile kiosk 308 may include one or more user inputs and one or more user outputs. Examples of user inputs include, without limitation, keyboards, keypads, touch screens, touch pads, and microphones. Examples of user outputs include, but are not limited to, speakers, display screens (including touch screen displays), and indicator lights. Furthermore, it can be appreciated by one of skill in the art that the user input may be combined or operated in conjunction with a user output. An example of such an integrated user input and user output is a touch screen display that can both present visual information to a user and receive input selections from a user.

The communication interface 316 of the mobile kiosk 308 may be operable to facilitate communications between the mobile kiosk 308 and the contact center 100, 344. Examples of communication interfaces 316 include, but are not limited to, a network interface card, a modem, a wired telephony port, a serial or parallel data port, radio frequency broadcast transceiver, a USB port, or other wired or wireless communication network interfaces. In accordance with at least some embodiments of the present invention, the premises 304 may correspond to a first LAN and the contact center 100, 344 may correspond to a second LAN. The two LANs may be connected in a WAN-type configuration.

An exemplary configuration of a mobile kiosk 308 is described in U.S. Patent Application Publication Numbers 2006/289,637; 2006/293,968; and 2007/008,068 to Brice et al., the entire contents of which are hereby incorporated herein by reference. Although the mobile kiosks described in these particular patent publications are associated with a shopping cart, certain embodiment of the present invention may accommodate a customer's mobile communication device (e.g., a cellular phone, mobile email retrieval device, or Personal Digital Assistant (PDA)) to be used as the mobile kiosk 308 without having any association to a cart. Similarly, an on-premises customer service agent may carry a portable communication device that acts as the mobile kiosk 308.

The premises 304 may also include one or more RFID readers 328 that are operable to interface with the tracking device 320, thereby allowing position information to be obtained for the mobile kiosk 308, especially in relation to the premises 304. In a preferred embodiment, a plurality of RFID readers 328 are dispersed throughout the premises 304 to accommodate the detection and monitoring of the mobile kiosk's 308 movement. Each of the plurality of RFID readers 328 may be adapted to detect the presence of and interact with more than one RFID device, and therefore more than one mobile kiosk 308. Therefore, the plurality of RFID readers 328 on premises 304 may be capable of obtaining location data for a plurality of mobile kiosks 308 at the same time.

A video surveillance system 332 may also be provided on premises 304 to further facilitate the retrieval of position information for the mobile kiosk 308 as well as a customer associated therewith.

A presence server 336 and premises database 340 may also be included on premises 304. It should be appreciated that both of these devices (i.e., the presence server 336 and premises database 340) may, alternatively, be provided off premises 304 but may be used to maintain information for the associated premises 304. The presence server 336 may be operable to maintain presence information for customers on premises 304 as well as maintain presence and availability information for customer service agents on premises.

In accordance with at least one embodiment of the present invention, the presence server 336 may maintain a listing of customers that are on premises 304 and may further track whether such customers are currently in queue or being serviced by the contact center, or other entity, 100, 344. Similarly, the presence server 336 may maintain a listing of customer service agents that are currently working on premises 304 and may provide that information to the contact center 100, 344. The presence server 336 may also track the status of availability for each on-premises customer service agent (e.g., whether the customer service agent is helping a customer on premises 304, whether the customer service agent is helping a customer on another premises 304 via a contact routed through the contact center 100, 344, whether the customer service agent is on break, whether the customer service is available to service a contact, or whether the customer service agent is not available to service a contact). The contact center 100, 344 may use this status information to determine whether the customer service agent can be assigned to an agent queue and more specifically whether a contact can be assigned to the customer service agent.

The premises database 340 may be utilized to store information specific to the premises 304. For example, inventory levels for various items typically offered on premises 304 may be maintained in the premises database 340. As another example, the types of products currently being shipped to the premises 304 may be maintained in the premises database 340.

Although the contact center 100, 344 is depicted as being separate from the premises 304, it may also be possible to utilize each customer service agent on premises 304 as a contact center 100, 344 customer service agent. In other words, a specialized customer service agent may be employed at one premises 304. That customer service agent may also have a communication device 134, 138 that is linked to the contact routing equipment of the contact center. This may allow the customer service agent to provide face-to-face service to customers at his/her premises 304 while also allowing that customer service agent to accept contacts initiated at other premises 304. Again, this can help leverage the specialized skills possessed by the agent and further reduce employment costs that would otherwise be realized if a similar agent had to be staffed at each premises 304. Moreover, the specialized customer service agent may be allowed to more fully utilize their skills on a daily basis since they are helping service customers across a plurality of premises 304.

The contact center 100, 344 may also have access to a vendor database 352 in addition to having access to an enterprise database 114, 348. The vendor database 352 may be a more product-specific database that maintains information for certain products as well as their related products and parts. Access to the vendor database 352 may be useful to a contact center agent when servicing a particular on-premises contact. For example, the customer on premises 304 may have recently purchased a particular item (e.g., a lawnmower) at the same premises 304. The contact center agent can retrieve that product information from the vendor database 352 to identify what other types of products are related to the previously purchased lawnmower. The contact center agent can utilize this information to determine if the purchased lawnmower is still under warranty and how to return to the vendor, or identify certain parts that may be needed for the lawnmower (e.g., spark-plugs, engine oil, etc.) as well as whether there have been any recall issues for the lawnmower.

The enterprise database 114, 348, on the other hand, may maintain enterprise-specific information. For example, a customer's contact and purchase history may be maintained in the enterprise database 114, 348. When that particular customer initiates a contact (either in the traditional fashion or from a mobile kiosk 308), the contact center agent may recover the customer's history from the enterprise database 114 348. Additional information that may be retrieved from the enterprise database 114, 348 includes whether the customer is a preferred customer or whether the customer has been selected to participate in a customer feedback survey. Simultaneous access to the premises database 340, enterprise database 114, 348, and vendor database 352 allows a customer service agent in the contact center to personalize the customer's experience while also allowing the customer to peruse products in person at the premises 304 and obtain face-to-face help, if needed.

Figure 4:
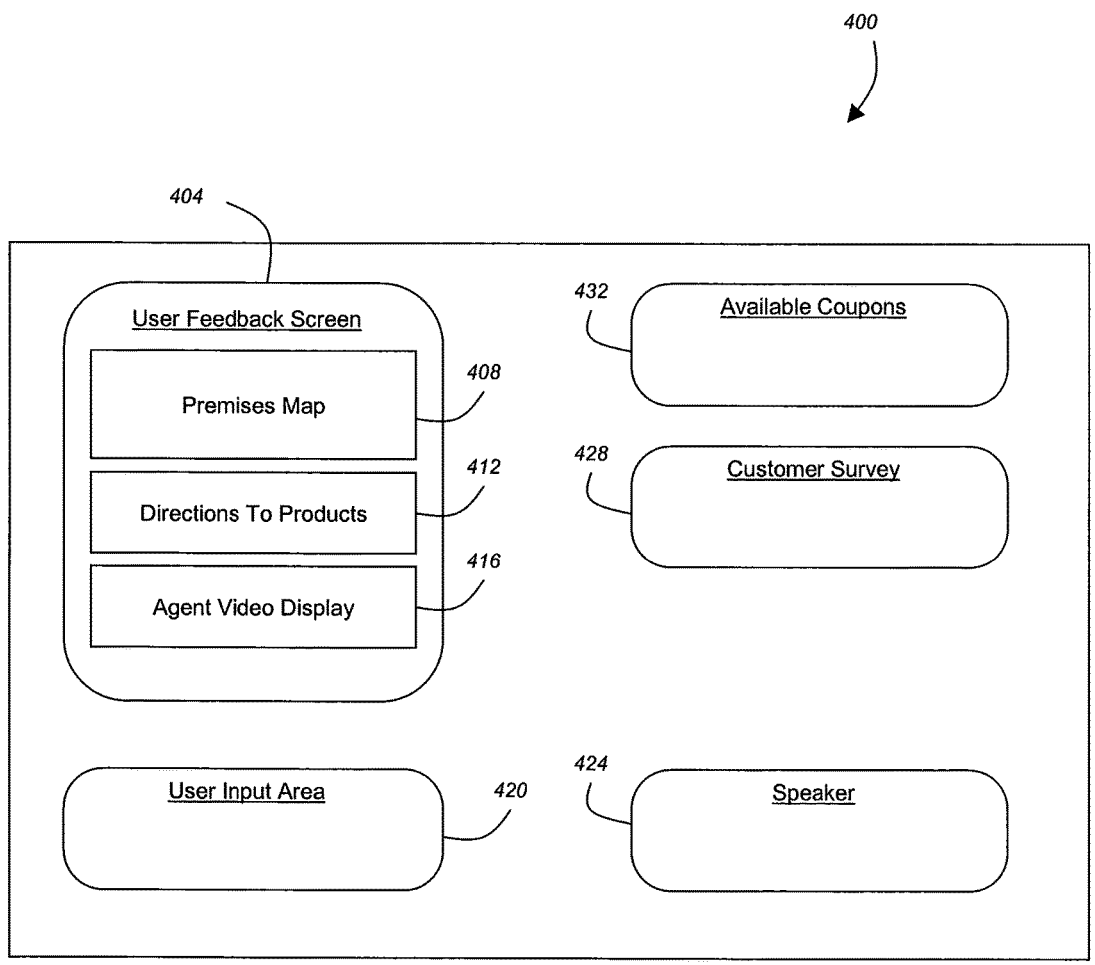
FIG. 4 depicts a user interface of a mobile kiosk in accordance with at least some embodiments of the present invention.

Referring now to FIG. 4, an exemplary user interface 312, 400 of the mobile kiosk 308 will be described in accordance with at least some embodiments of the present invention. The user interface 312, 400 may include a user feedback screen 404, a user input area 420, a speaker 424, a customer survey section 428, and an available coupons display section 432. The user feedback screen 404 may include a premises map 408, an area providing directions to certain products or other locations of interest in the premises 304, and an agent video display 416. As noted above, the user input area 420 and feedback screen 404 may be combined into an input/output type device, such as a touch-screen.

Information for the premises map 408 may be obtained from the tracking device 320 as well as the RFID reader 328 and video surveillance 332. Each of these devices may be used to cooperatively generate a real-time map of the premises 304 that includes the current location of the mobile kiosk 308. The customer or on-premises customer service agent (whoever is handling the mobile kiosk 308) may utilize the premises map 408 to identify where they are in relation to where they want to be. Additionally, the directions to products area 412 may provide specific directions to get to certain locations in the premises 304. Typically, the directions to products section 412 will just supplement the premises map 408. However, there may be certain instances where the directions to products section 412 can provide better specific directions that help the customer avoid closed aisles, spilled products, or any other real-time hazards/obstacles on premises 304.

The agent video display 416 may allow real-time video of a contact center agent servicing the contact to be viewed on the mobile kiosk 308. This allows the customer service agent to be viewed as well as heard by either the customer or the on-premises customer service agent assisting the customer. The agent video display 416 may prove particularly useful in situations where the customer is hearing impaired and is interacting with a customer service agent via sign-language or printed means. Similarly, if the on-premises customer service agent is assisting a hearing-impaired customer that can only communicate using sign-language, then the customer service agent may initiate a contact via the mobile kiosk 308 and the off-site customer service agent that communicates using sign-language may view the customer via the video surveillance 332 (which could be a video camera provided on the on-premises customer service agent) and then the customer service agent could communicate directly back to the customer via the mobile kiosk 308 being carried by the on-premises customer service agent.

In an alternative embodiment, if the customer is hearing impaired but is capable of reading lips, then the specialized customer service agent may still view the customer speaking sign-language via the video surveillance 332 and then provide instructions to the on-premises customer service agent to respond to the customer. The on-premises customer service agent may then speak in a normal fashion and the customer can read his/her lips.

The available coupons 432 and customer survey 428 areas may be utilized to solicit and collect customer feedback while the customer is shopping or checking out via the mobile kiosk 308. More particularly, the available coupons section 432 may display to the customer what types of coupons may be available to the customer if they participate in the survey shown in the customer survey area 428. This real-time incentive and feedback may help to solicit more feedback and improve the operations of the premises 304 as well as the customer service system 300. It may also be possible to track coupons that have already been disseminated to the customer via email, regular mail, or other coupon distribution channels. These coupons may be registered and associated with the customer then stored in the available coupons section 432. This way, when the customer goes to purchase items from the premises 304, the coupons that have already been received by the customer can be recalled via the mobile kiosk 308 and applied toward the current purchase.

Figure 5:
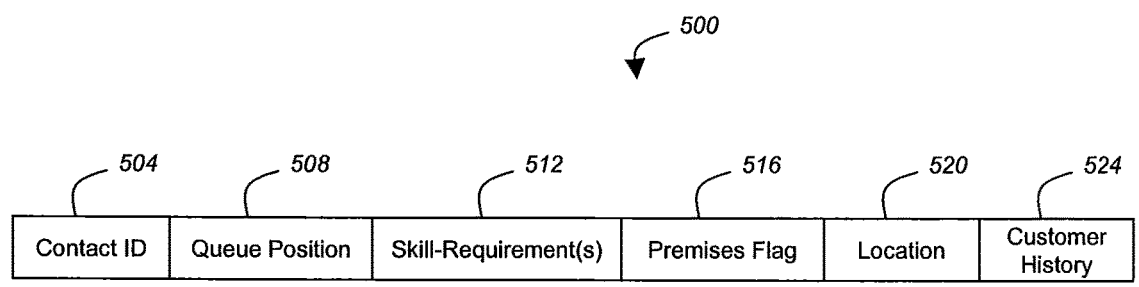
FIG. 5 is a block diagram depicting a data structure used in accordance with at least some embodiments of the present invention.

With reference to FIG. 5, an exemplary data structure 500 will be described in accordance with at least some embodiments of the present invention. The data structure 500 may include a contact ID field 504, a queue position field 508, a skill-requirement(s) field 512, a premises flag field 516, a location field 520, and a customer history field 524. The data structure 500 may also include additional fields that are populated with data from the premises database 340, enterprise database 348, and/or vendor database 352.

The contact ID field 504 may provide a unique identification for the contact. For example, the contact ID field 504 may The contact ID field 504 may also indicate whether the contact is from a preferred customer, a preferred premises 304, or the like.

The queue position field 508 may indicate either the current queue position of the contact or the required beginning queue position of the contact. The required beginning queue position of the contact may vary depending upon whether the contact contains a premises flag. Additionally, the queue position field 508 may provide an indication of the queue in which the contact should be or is actually placed.

The skill-requirement(s) field 512 may indicate the particular skill requirements that are needed by a contact center agent to service the contact. In other words, the skill-requirement(s) field 512 may indicate the nature of the contact and whether the customer has any special needs (e.g., language needs, product information needs, credit information needs, etc.). The skill-requirement(s) field 512 may also help to determine in what queue the contact is placed (i.e., what agent will be allowed to service the contact).

The premises flag field 516 may comprise the indicator of whether the contact has been assigned a premises flag or not. In accordance with one embodiment of the present invention, the premises flag field 516 may comprise an indicator bit whose value represents whether the contact has been assigned a premises flag. The value of the field may be assigned 1 if the contact has been tagged with a premises flag and 0 if not. Of course, an opposite logic representation could be adopted whereby, the field is given a 0 value if the contact has been tagged with a premises flag and 1 if not.

The location field 520 may comprise both historical and current location information for the mobile kiosk 308 that has initiated the contact. The location field 520 may also contain information related to certain real-time obstacles on premises 304. The location information in the location field 520 may be used to help the customer reach certain points of interest and/or products in the premises 304.

The customer identification field 522 contains information on who the customer is, including the customer's name and any other pertinent customer identification information such as the customer's telephone number and membership information. For example, the customer identification field 522 may represent the identity of the customer or the on-premises agent that initiated the contact.

The customer history field 524 contains information retrieved from the enterprise 348 and/or premises 340 databases. The customer history field 524 may be utilized by the contact center agent to help customize and personalize how contacts are serviced. Alternatively, the information from the customer history field 524 may be made available to on-premises customer service agents to help them more efficiently and completely assist customers on premises 304.

Figure 6:
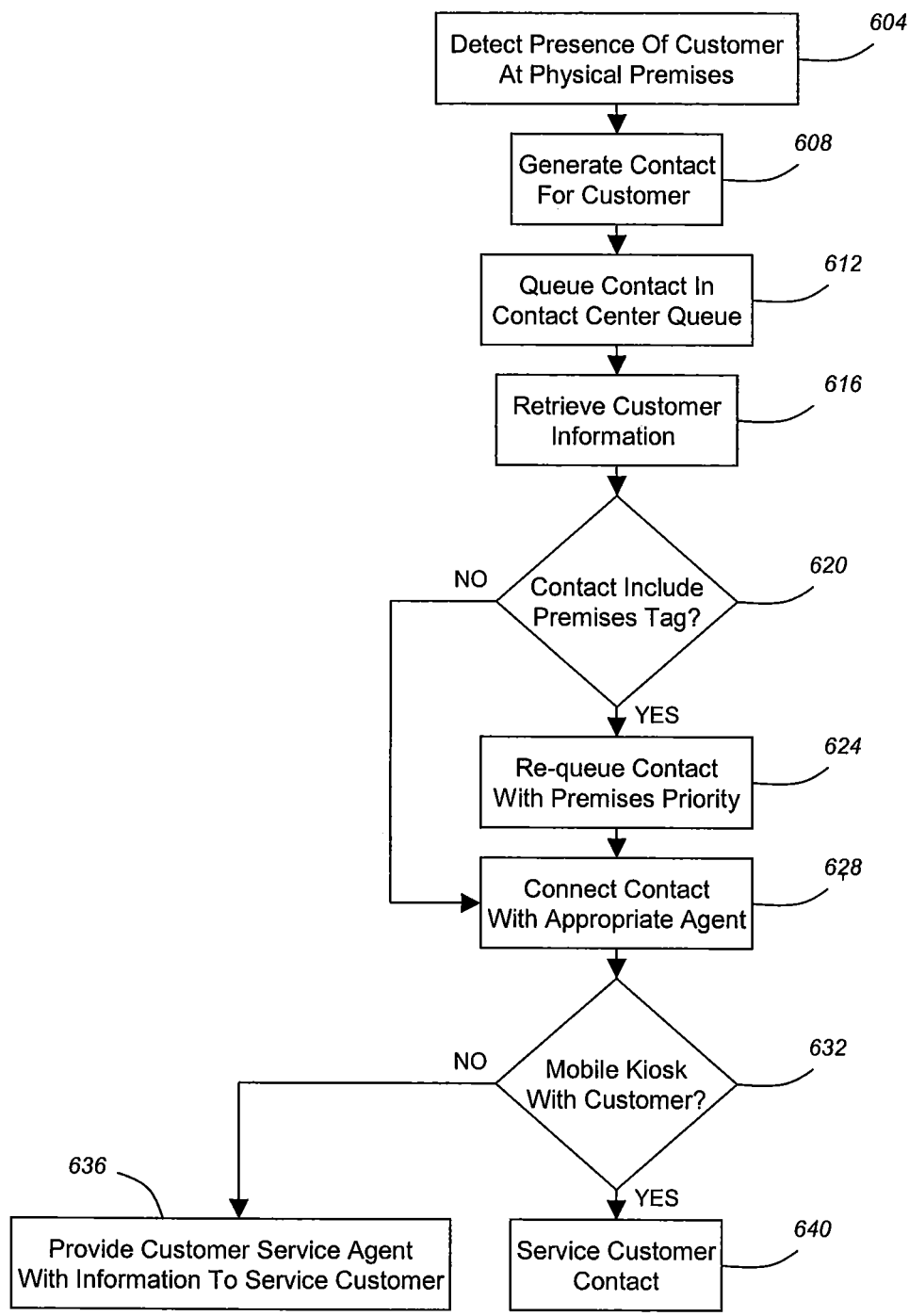
FIG. 6 is a flow diagram depicting a general customer service method in accordance with at least some embodiments of the present invention.

FIG. 6 depicts a customer service method in accordance with at least some embodiments of the present invention. The method is initiated when the presence of a customer is detected on a premises 304 (step 604). The detection of a customer may occur in a number of different ways. In one embodiment, the customer may be carrying a communication device that can also double as a mobile kiosk 308 (e.g., a cellular phone, PDA, wireless email retrieval device, etc.). The presence of the mobile kiosk 308 on premises 304 may be detected, for example, via the tracking device 320. The customer's presence may also be detected by having the customer sign in or otherwise register with the mobile kiosk 308. Still another way that the customer's presence can be detected is by receiving a call from the customer at a number dedicated to premises-based contacts. Yet another way that the customer's presence may be detected is by having an on-premises customer service agent or some other employee physically identify that a customer has entered the premises 304 and register such information with a mobile kiosk 308.

After detecting the presence of a customer on premises 304, the method continues by generating a contact for the customer and sending the contact to the contact center 100, 344 (step 608). It may not be necessary, however, for all customers to require interaction with the contact center. To accommodate such a situation, it may be possible to just place a contact in a queue for service if some service were requested, e.g., the customer indicated some question or need for service. The contact is generally generated by the mobile kiosk 308 and the mobile kiosk 308 may be carried either by the customer or by an on-premises customer service agent. When the contact is received in the contact center 100, 344 it is placed in a contact queue 208 (step 612). The queue in which the contact is initially placed may correspond to a general intake queue.

A means for conferencing the customer with a contact center agent and a present customer service representative may also be provided, along with being able to transfer the contact center agent from the customer mobile kiosk to the present contact center representative. More specifically, there may be a situation where the present customer service representative can understand the "language" of the contact center representative and be of more assistance to the customer than the contact center agent talking directly to the customer. For example, maybe the customer is not familiar with "mechanic" speak and doesn't know the right terminology for the customer to communicate her needs to a contact center agent. The present customer service representative can take the contact from the customer and interact with the contact center agent, providing translation service to the customer.

In accordance with at least some embodiments of the present invention, it may also be possible to conference the contact center agent with both the present contact service representative and the customer. This may be accomplished in number of ways. For example, the mobile device may be automatically put on speakerphone. Alternatively, a conference between the communication devices of the contact center agent, customer, and local customer service representative may be established (i.e., through a conference bridge or the like). A conference between all parties may be useful to help the customer via the most appropriate means.

Once in queue, the contact is analyzed to determine if any customer information is available for the initiating customer. If customer information is available, then the customer information is retrieved (step 616). Customer information may be retrieved from the appropriate database (e.g., the enterprise database 352 which may contain customer history information). Alternatively, or in addition, customer information may be retrieved as a part of the initial contact intake. For example, the IVR 122 may query the customer for certain information (e.g., nature of the contact, questions to be answered, etc.) that can be used to help service the customer.

Upon retrieving the customer information, the method continues by determining whether the contact has been tagged with a premises tag (step 620). This analysis may be performed by the agent and contact selector 220 if the premises service module 232 tagged the contact with the premises tag. Alternatively, the analysis may be performed by the premises service module 232 if the contact was tagged as a premises-based contact before it entered the contact center 100, 344.

If the contact includes a premises tag, then the contact is re-queued with a premises priority (step 624). The re-queuing of the contact may comprise placing the contact at a higher queue position in a queue that it was previously placed (e.g., a queue corresponding to the skill-requirements of the queue). Alternatively, the re-queuing may comprise placing the contact in a different queue that is dedicated to premises-based contacts.

Thereafter, or in the event that the contact does not include a premises tag, the method continues by connecting the contact with the appropriate contact center agent (step 628). The contact center agent is typically chosen based on a match between the agent's skills and the skill requirements of the contact. The chosen agent may be located in the contact center 100, 344. Alternatively, the chosen agent may be located at the same or at a different premises 304 from where the mobile kiosk 308 is located.

Once the contact center agent is connected with the contact, the method continues by determining whether the mobile kiosk 308 is being carried by the customer (step 632). This determination will affect the way in which the contact is serviced. In the event that the mobile kiosk 308 is being carried by the customer, then the contact center agent services the customer directly via the contact (step 640). If, on the other hand, an on-premises customer service agent is carrying the mobile kiosk 308, then the contact center agent provides the on-premises customer service agent with instructions and information that help the on-premises customer service agent properly provide service to the customer (step 636).

There are a number of different ways in which a customer is serviced either directly or indirectly through a mobile kiosk 308 that is connected with a contact center 100, 344 and contact center agent. In one example of directly servicing a customer-initiated contact, once the business recognizes that a customer has entered the premises 304, a greeting may be sent to the customer's communication device. Upon confirming that the customer is interruptible and wants assistance, a greeting can request the purpose of the customer's visit (e.g., does the customer need to make a return, is the customer looking for a specific item, etc.). Advantageously, the same dialogue used for a call or Internet interaction/contact can be used with the mobile kiosk 308 interaction. Plus, while on-premises, the mobile kiosk 308 (i.e., the customer's personal communication device) may be used to help lead the customer where he/she needs to be (e.g., to the return center, directions to a specific aisle, or directed to an appropriate and available customer service associate).

The contact center agent can know the history of the customer. For instance, the contact center agent can quickly retrieve the customer's purchase history from the enterprise database 348 and determine if a recently purchased lawn-mower needs to have a tune up. If so, the contact center agent or the IVR 122 can recommend to the customer via the mobile kiosk 308 the supplies needed for a tune-up. The customer can even be directed to the location within the store to find the supplies. The customer may also be asked if they would like a maintenance agreement if the warranty is about to expire. This particular part of the customer interaction can be handled relatively easily by an automated contact center resource without requiring the assistance of a human in the store or a live contact center agent.

The customer may also desire to start a project, such as a paint project. The customer's contact may be connected to a paint subject matter expert via the contact center 100, 344 and the customer may be provided with supply recommendations. A list of the supplies may also be displayed to the customer via the mobile kiosk 308, thereby allowing the customer to check-off the unwanted or retrieved supplies. The customer may even be provided with information about brands and types of paint to help guide the customer's purchase. The customer may also be provided with information regarding current sales in progress (e.g., the customer may receive a message via the mobile kiosk 308 that brand X of paint is on sale for only $xx.xx per gallon). Additionally, the mobile kiosk 308 may integrate with an enterprise Customer Relationship Management (CRM) application to know whether or not the customer has been recently sent a coupon. If so, a message may be sent to the mobile kiosk 308, either automatically or from the contact center agent, reminding the customer of the coupon and which product(s) it applies to. The mobile kiosk 308 may also keep track of the coupon information so that an "electronic" coupon can be applied at the register without the customer having to physically have the coupon (assuming that the coupon has not already been used).

Another advantage provided by the mobile kiosk 308 is that the business can queue the customer without the customer physically waiting in line. When the customer's turn is up (i.e., they are the next person in line), a notification can be sent to the customer via the mobile kiosk 308. As an example, the customer may indicate a need for a return. The customer can, however, go shop while waiting for a customer service representative to become available to handle the return. In fact, the customer could go shop for a replacement product while being queued for the return. The history of the customer could be used to narrow down the possibility of what is being returned, a list of which could then be presented to the customer on their mobile kiosk 308. The customer could identify on the mobile kiosk 308 which item(s) are being returned without actually requiring the customer to enter the return line. Once the customer contact gets to the head of the line, the premises-based customer service agent could process the return and a copy of the receipt could be waiting at the customer service desk by the time the customer is contacted to proceed to the customer service desk.

In another example of directly servicing a customer-initiated contact, visually-impaired customers may be directly serviced if they are carrying a mobile kiosk 308. In accordance with one embodiment, the enterprise would recognize that a visually-impaired person has arrived on premises 304 (based on prior registration). The enterprise would contact the customer's mobile kiosk 308 (e.g., phone) via voice. The enterprise would prompt the customer as to her/his needs. Once the needs are identified, the customer can be directed as to where to go in the store. This navigation system may be similar to navigation systems in vehicles (e.g., "turn right in 5 feet", and then 5 feet later "turn right now"). It would be useful for the enterprise to notify the visually-impaired person of closed aisles and other obstacles (e.g., "the aisle is temporarily closed for inventory management, please wait xxx for your safety", where "xxx" could be where the customer currently resides, or a location out of the way). A customer could also be instructed to continue shopping where the aisle is not closed.

Once the visually-impaired person was led to the right place in the store, s/he may be assisted in selecting the desired item. One way of accomplishing this would be to give shelf information and possibly more information as to where the item is stocked. The customer could then scan the UPC of the product with their mobile kiosk 308 or some other readily available scanning mechanism to verify the visually-impaired person has selected the desired item.

As can be appreciated, the mobile kiosk 308 may also be provided on the cart that provides the "navigation system," meaning that the cart knows where it is in the store and possibly where the aisles are closed. The voice portion would be with a remote agent or content analysis software. If the mobile kiosk 308 were mounted to the carts, then the carts could know the position of other carts so that a visually-impaired person can be directed around other carts, directed to check out, as well as directed to the end of a line without running into another cart and/or people. In accordance with at least some embodiments of the present invention, the cart could be a pull behind cart and the navigation system would adjust to the fact that the user is one step ahead of the cart. Additional provisions can be made to ensure a capable person is pushing the cart and asking for assistance.

Proximity to the cart may also be an important consideration when providing automated navigation assistance.

In yet another example of directly assisting a customer, there can be content analysis software at the contact center 100, 344 that identifies keywords and provides generic answers to inquiries. For instance, if the customer submits an inquiry regarding the location of humidifier filters on premises 304, the contact center software may provide a general map to the customer indicating the location of humidifier filters.

In one example of indirectly assisting a customer, a retail associate with a mobile kiosk 308, preferably equipped with a wireless headset, may be allowed to access a subject matter expert (via the contact center 100, 344) by pressing a button to request assistance. The mobile kiosk 308 would place a call to the appropriate pool of expert resources at a contact center 100, 344, based on the location of the worker in the business. In other words, a skill requirement for the contact may be determined based upon the known location of the mobile kiosk 308. For example, if the retail associate is in the printer aisle, the assistance call would be placed to a group of experts in printer and scanner technology. The subject matter experts would have access to knowledge bases about the products, information on quantities and exact location on premises 304, they may be able to see and hear the customer and retail associate using video and microphones. Subject matter experts could be put on speakerphones to join the conversation.

In accordance with at least some embodiments of the present invention, the mobile kiosk 308 being carried by the retail associate may initiate a contact that is put in a contact center queue and the associate's location relative to the type of merchandise at that location may be determined. This location information may be coupled with existing contact center capabilities to find contact center agents based on sets of criteria, such as expertise in particular areas. When the associate initiates a call for assistance, the location information determines the experts to whom the call is routed. Standard contact center capabilities then are used to process the call, including re-routing to backup groups if the wait time is too long for the primary experts requested.

The information about location could also be coupled with resident expert capabilities, whereby experts who are not agents signal their presence and availability to handle contacts. These resident experts have responsibilities other than answering inquiries, but may be interruptible to handle such calls or other contacts requesting assistance.

Hence, for the hearing-impaired, an associate knowledgeable in sign language could be contacted by the retail associate to help in translation. If there is a camera on the mobile kiosk 308 of an unskilled worker (i.e., unskilled in the art of sign language communication), then streaming video can be sent from the camera to send/receive visual information back to the call center agent knowledgeable in sign language. The combination of the call center agent with the correct product/language expertise and the unskilled worker to help with the customer's physical limitations should quickly resolve the customer's needs. Thus, an on-premises associate knowledgeable in sign language is not required to facilitate communications with the hearing-impaired customer. The user interface 312 (e.g., a video screen) of the mobile kiosk 308 may be used as a visual mechanism to render the response from the contact center agent visible to the customer. The use of streaming video to/from the mobile kiosk 308 may allow a seamless conversation to be supported between the customer and the contact center agent.

Figure 7:
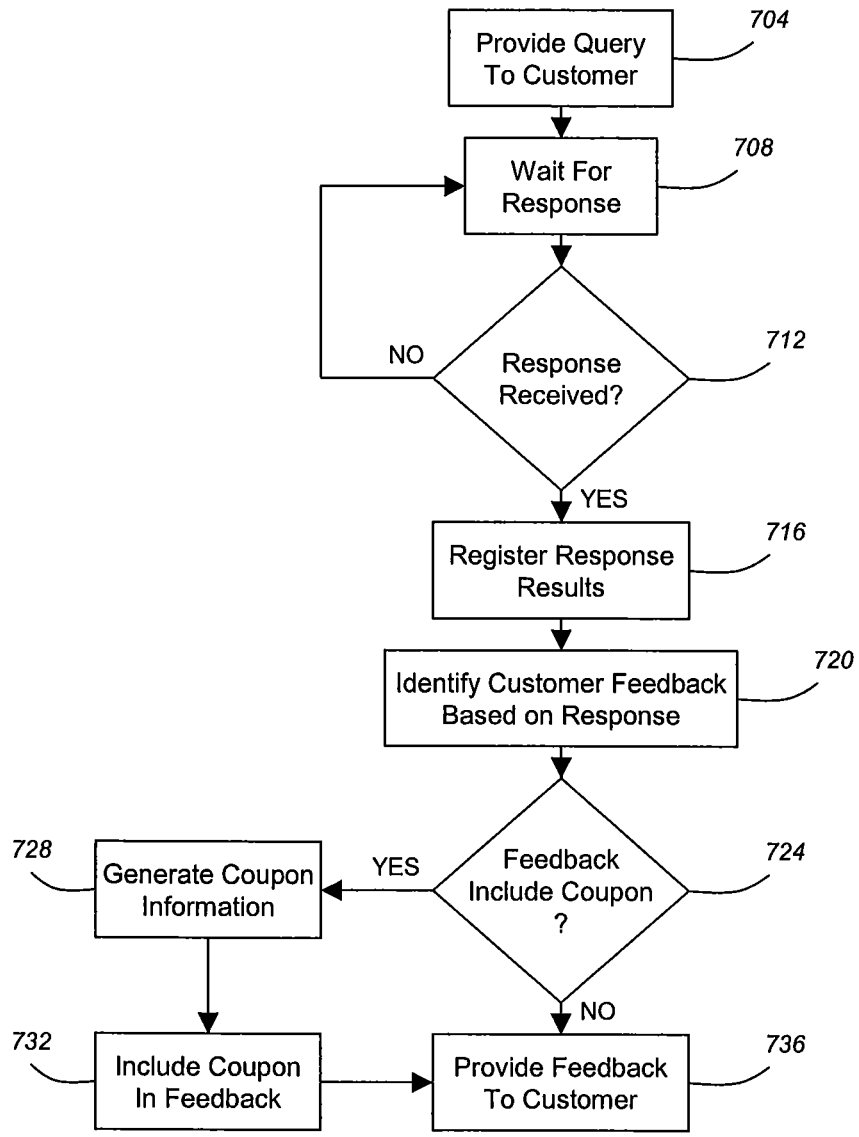
FIG. 7 is a flow diagram depicting a customer feedback method in accordance with at least some embodiments of the present invention.

Referring now to FIG. 7, a more detailed customer interaction method will be described in accordance with at least some embodiments of the present invention. The method begins by providing the customer with a query (step 704). The query may be provided to customers any time they are on premises 304, however, it may be particularly advantageous to query customers after they have picked up all of their items and are waiting to check out. The query provided to the customer may be automatically provided by the IVR 122 or some other automated message generating agent. Alternatively, the query may be provided by a contact center agent. Exemplary queries that may be provided to customers include asking whether they found everything they needed and if they did not, why not. After the query has been provided, the customer service system waits for a customer response (step 708).

Once it is determined that a response has been received from the customer (step 712), the method continues by registering the response results (step 716). As one example, the customer could provide an audio response to the IVR 122, which is recorded and made available to store management. The feedback may also be maintained in the enterprise database 348 and/or premises database 340 for future reference. The mobile kiosk 308 may even prompt the customer for a voice recording of any issues, positive or negative, encountered during the shopping experience. This can include feedback on inventory, ease of finding items, ease of mobile kiosk 308 use, selection, and any associate contact. It can then be up to the store to follow up on customer feedback.

Based on the customer's response, additional customer feedback (e.g., a second query or second message) may be identified for transmission to the customer (step 720). The customer feedback may include a request to visit again or some other general departure message. Alternatively, or in addition, the feedback may include a coupon for use in the customer's current purchase or for use in a future purchase. Accordingly, in step 724, it is determined whether the customer feedback includes a coupon. In accordance with at least one embodiment of the present invention, this determination may be affirmatively made if it is determined that the customer has waited for an exceptionally long time in the checkout line. This determination may also be affirmatively made based on the types of products that have been picked up by the customer.

If the feedback is determined to include a coupon, the method continues by generating coupon information (e.g., what products the coupon is good for, how long until the coupon expires, and other terms/conditions of redemption) (step 728). Thereafter, the coupon is included in the feedback message that is to be provided to the customer's mobile kiosk 308 (step 732). After the coupon has been incorporated in the customer feedback, if it is to be incorporated at all, the method continues by providing the feedback to the customer (step 736).

In one specific implementation, upon entering a check-out line, the mobile kiosk 308 could be used as a vehicle to conduct a customer feedback survey. The customer could identify certain items that are going to be purchased or the system could identify potential items that were of interest to the user based upon detecting the movement of the user in the premises 304 (e.g., an interest in a particular item or type of items may be inferred if the customer was detected at a particular location on premises 304 for an extended period of time). Based on such information the customer may be provided with a chance to participate in a customer feedback survey and if the customer finishes the survey he or she may be provided with a coupon that is immediately redeemable for their current purchase. The customer could fill out the survey and then receive a discount on their total purchase or a discount for particular items that are purchased. The survey may be related to a particular product or to the overall shopping experience and the nature of the coupon may vary depending upon the nature of the survey. For instance, a general survey may correspond to the generation and granting of a general coupon redeemable only at the premises 304, whereas a product-specific survey may correspond to the generation and granting of a product-specific coupon that is redeemable only for a specific product but at any premises 304 that carries such product. Also, based on the results of the survey, the customer may be provided with the opportunity to speak directly with a manager (via face-to-face, voice, video, etc.) to personally express any accolades or frustrations that the customer has based on his/her experience. This may help the customer feel more like his/her input is being considered, further enhancing the shopping experience.

A customer survey may alternatively be provided after the customer has left the store. Upon leaving the store, the mobile kiosk 308 could be used to provide a survey to the customer to determine the customer's satisfaction with the experience. The generation of the survey may vary depending upon the customer's registered survey preferences (e.g., no preference, prefers no surveys, survey each visit, randomly administer survey, circumstantially administer survey, etc.). If the customer is determined to be leaving the premises 304 without a purchase, further inquiries could be made to find out why there wasn't a purchase (e.g., lack of inventory or price). Another question could be whether the customer is continuing to shop elsewhere. Depending upon the situation, the business could set up an automatic notification to the customer when the desired item is in stock. Alternatively, the item could be sent to the customer from a warehouse upon the customer accepting the charges for the, item and shipping. The use of a post-shopping survey may be advantageous because the customer is allowed to complete the survey at a more convenient time. A minimal survey can include whether the customer wants to complete a detailed survey at a given point in time. Another use of a product survey would be upon entry to the store. If the system knew that a particular customer purchased a lawn-mower last month, a survey could be sent to the customer asking about the customer's satisfaction with the recent purchase.

Figure 8:
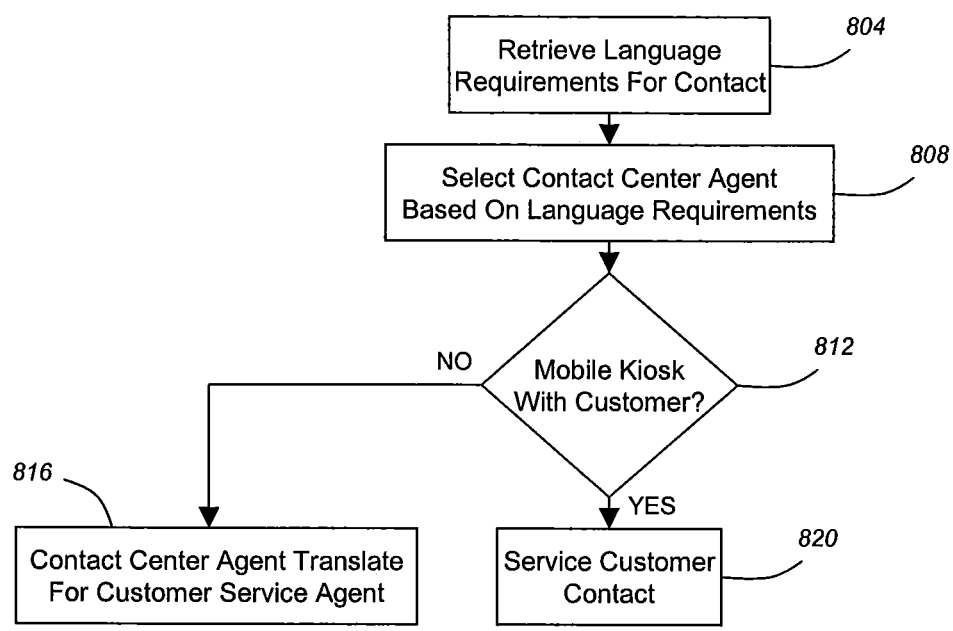
FIG. 8 is a flow diagram depicting a customer language accommodation method in accordance with at least some embodiments of the present invention.

FIG. 8 depicts an exemplary language accommodation method in accordance with at least some embodiments of the present invention. The method is initiated when language requirements are retrieved for the contact (step 804). These requirements may be retrieved directly from the mobile kiosk 308 and included in the initial contact information or may be retrieved from the customer via a query/response exchange with the contact center 100, 344. After the customer's language requirements have been determined, the method continues by selecting the appropriately skilled contact center agent (step 808). This agent may be located at the contact center 100, 344, at different premises 304 than the one where the customer is located, or on the same premises 304 as the customer.

Thereafter, it is determined whether the mobile kiosk 308 is being carried by the customer or by an on-premises customer service agent (step 812). If a customer service agent is carrying the mobile kiosk 308, the selected contact center agent may act as a translator between the customer and the on-premises customer service agent (step 816). Alternatively, if the mobile kiosk 308 is carried by the customer, or the on-premises customer service agent gives her mobile kiosk 308 to the customer, then the contact center agent may directly service the customer contact by communicating with the customer via the user interface 312 (step 820).

It should be appreciated that embodiments of the present invention may be utilized by retailers, restaurants, hotels, tourist attractions, or as a new niche for a service provider (e.g., AAA). Examples of where this could be used include a retailer that wants to reduce the cost of associates by encouraging self-service while on-premises. A hotel may offer a service to check-in while you wait in line so your room key(s) are available as soon as you reach the desk. Tourist attractions, such as Disney World, can provide users with wait times for rides based on user preferences and guide users to the shortest line. Alternatively, tourist attractions may virtually queue visitors in line and notify them when it is almost their turn to ride the ride. Service providers could register customers so that they are known business partners. This would allow customers to get preferred rates whenever they are on-site at a business partner's location. The service provider could also provide their business partners with the customer's preferences, special needs, and so on without ever bothering the customer. For instance, AAA may know that a particular customer lives in Denver, Colo. When that particular customer enters a tire store (assuming the tire store is a AAA business partner) in another state, then the tire store can be notified (via the AAA service in this example) that the customer is traveling and may need an emergency repair. This would allow the tire store to prioritize the customer's needs accordingly. Additionally, the customer could utilize the mobile kiosk 308 to identify his needs even while waiting in line at the store. The tire store could then utilize the mobile kiosk 308 to notify the customer when the service is done on the vehicle.

While the above-described flowcharts have been discussed in relation to a particular sequence of events, it should be appreciated that changes to this sequence can occur without materially affecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special-purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using procedural or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special-purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for efficiently routing contacts in a contact center architecture. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A contact center, comprising:
    a plurality of network interfaces that enable the contact center to receive and service contacts from a plurality of premises;
    a microprocessor; and
    computer memory comprising instructions that are executable by the microprocessor, the instructions, when executed by the microprocessor, enabling the contact center to:
        receive a contact at a network interface of the multiple network interfaces;
        analyze the contact to determine whether the contact includes a premises tag that identifies the contact as originating from a first premises in the plurality of premises as opposed to originating from a second premises in the plurality of premises;
        determine that the contact comprises the premises tag that identifies the contact as originating from the first premises as opposed to the second premises; and
        in response to determining that the contact comprises the premises tag, facilitate establishment of a communication session between a contact center agent and a person carrying a mobile kiosk with preferential treatment as compared to treatment if the contact lacked the premises tag.

2. The contact center of claim 1, wherein the preferential treatment comprises re-queuing the contact, wherein the contact was previously queued, for the person within the contact center based on the premises tag.

3. The contact center of claim 2, wherein re-queuing the contact comprises moving the contact from an initial queue position to a queue position that will be serviced prior to the initial queue position.

4. The contact center of claim 2, wherein re-queuing the contact comprises moving the contact from a first assigned queue to a different queue.

5. The contact center of claim 1, wherein the premises tag indicates that the person is located at the first premises and further identifies the person's location within the first premises, and wherein the premises tag identifies the contact as a premises-based contact such that the contact center marks the contact as originating from the first premises.

6. The contact center of claim 5, wherein the instructions, when executed by the microprocessor, further enable the contact center to:
    determine the person's location within the first premises; and
    generate a display of the person's location on a premises map to be provided via a user interface of the mobile kiosk.

7. The contact center of claim 5, wherein the instructions, when executed by the microprocessor, further enable the contact center to:
    determine a first skill requirement based on the premises tag;
    after identifying the contact as a premises-based contact, determine the person's location within the first premises; and
    determine a second skill requirement based on the person's location.

8. The contact center of claim 5, wherein the instructions, when executed by the microprocessor, further enable the contact center to:
    determine the person's location within the first premises; and
    provide directions for the person to a location of interest on the first premises, wherein the directions are provided via a user interface of the mobile kiosk.

9. The contact center of claim 5, wherein the contact further comprises location data, and wherein the location data is distinct from the premises tag.

10. The contact center of claim 1, wherein the instructions, when executed by the microprocessor, further enable the contact center to:
    determine a service requirement for the person;
    determine a skill requirement based on the service requirement for the person; and
    facilitate routing of a contact for the person within the contact center to an agent that has a skill set corresponding to the skill requirement.

11. The contact center of claim 1, wherein the person comprises a customer.

12. The contact center of claim 1, wherein the person comprises an employee that works at the first premises.

13. The contact center of claim 1, wherein the instructions, when executed by the microprocessor, further enable the contact center to:
    receive an image or video of the person with a camera of the mobile kiosk; and
    provide the image or video to a contact center agent working at the contact center.

14. The contact center of claim 13, wherein the instructions, when executed by the microprocessor, further enable the contact center to:
    receive an image or video of the contact center agent at the mobile kiosk; and transmit the image or video of the contact center agent to the mobile kiosk.

15. The contact center of claim 1, wherein the premises tag comprises an identifier of the first premises, wherein the identifier is associated with a business, and wherein the association assists the contact center to identify the business with which a message for servicing the contact is associated.

16. A server, comprising:
a microprocessor; and
computer memory comprising instructions that are executable by the microprocessor, the instructions, when executed by the microprocessor, enabling the server to:
receive a contact;
analyze the contact to determine whether the contact includes a premises tag that identifies the contact as originating from a first premises in the plurality of premises as opposed to originating from a second premises in the plurality of premises;
determine that the contact comprises the premises tag that identifies the contact as originating from the first premises as opposed to the second premises; and
in response to determining that the contact comprises the premises tag, facilitate establishment of a communication session between a contact center agent and a person carrying a mobile kiosk with preferential treatment as compared to treatment if the contact lacked the premises tag.

17. The server of claim 16, wherein the preferential treatment comprises re-queuing the contact, wherein the contact was previously queued, for the person within the contact center, wherein the re-queuing places the contact in a secondary queue dedicated to contacts originating from the first premises.

18. The server of claim 17, wherein re-queuing the contact comprises moving the contact from an initial queue position to a queue position that will be serviced prior to the initial queue position.

19. The server of claim 17, further comprising instructions enabling the server to mark the contact as a premises-based contact based on the premises tag, wherein re-queuing the contact comprises moving the contact from a first assigned queue to a different queue for premises-based contacts from the plurality of premises.

20. The server of claim 16, wherein the premises tag indicates that the person is located at the first premises and further identifies the person's location within the first premises, and wherein the premises tag identifies the contact as a premises-based contact such that the contact center marks the contact as originating from the first premises.

21. The server of claim 16, wherein the instructions further comprise:
instructions that determine a service requirement for the person; and
instructions that determine a skill requirement based on the service requirement for the person.

22. The server of claim 16, further comprising:
an image processor that receives images or videos of the person that are suitable for transmission to the contact center.

23. The server of claim 16, wherein the premises tag comprises an identifier of the first premises and a pointer to a first database associated with the first premises, and wherein the contact center identifies the database based on the pointer, a related vendor database based on the pointer, and a business with which a message for servicing the contact is associated based on the identifier.

24. A method of operating a contact center, comprising:
receiving a contact at a network interface of the contact center, wherein the contact center comprises multiple network interfaces that enable the contact center to receive and service contacts from a plurality of premises;
analyzing the contact to determine whether the contact includes a premises tag that identifies the contact as originating from a first premises in the plurality of premises as opposed to originating from a second premises in the plurality of premises;
determining that the contact comprises the premises tag that identifies the contact as originating from the first premises as opposed to the second premises; and
in response to determining that the contact comprises the premises tag, establishing a communication session between a contact center agent and a person carrying the mobile kiosk on an expedited basis as compared to basis if the contact lacked the premises tag.

25. The method of claim 24, wherein the communication session is established on the expedited basis by re-queuing the contact, wherein the contact was previously queued within the contact center.

26. The method of claim 25, wherein re-queuing the contact comprises moving the contact from an initial queue position to a queue position that will be serviced prior to the initial queue position.

27. The method of claim 25, wherein re-queuing queuing the contact comprises moving the contact from an first assigned queue to a different queue.

28. The method of claim 24, wherein the premises tag indicates that a person is located at the first premises and further identifies the person's location within the first premises.

29. The method of claim 28, further comprising:
determining a location of interest at the first premises;
determining a location of the person based on the premises tag; and
providing directions to move from the person's location to the location of interest.

30. The method of claim 24, wherein the premises tag comprises identification information for the contact, and wherein the premises tag comprises an identifier of the first premises and assists the contact center to identify a business with which a message for servicing the contact is associated based on an association between the identifier and the business.

* * * * *